United States Patent
Craft

(10) Patent No.: US 6,678,768 B1
(45) Date of Patent: Jan. 13, 2004

(54) METHOD AND APPARATUS FOR CONFIGURING REDUNDANT ARRAY OF INDEPENDENT DISKS (RAID)

(75) Inventor: David John Craft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 09/680,605

(22) Filed: Oct. 6, 2000

(51) Int. Cl.[7] .............................................. G06F 13/00
(52) U.S. Cl. ...................... 710/100; 711/114; 711/112; 710/5
(58) Field of Search ........................... 710/5, 100, 306; 713/168; 711/114, 112

(56) References Cited

U.S. PATENT DOCUMENTS

| | | | | |
|---|---|---|---|---|
| 5,768,623 A | * | 6/1998 | Judd et al. ..................... | 710/37 |
| 5,787,459 A | * | 7/1998 | Stallmo et al. ............. | 711/112 |
| 6,079,029 A | * | 6/2000 | Iwatani et al. ................ | 714/6 |
| 6,243,827 B1 | * | 6/2001 | Renner, Jr. .................... | 714/6 |
| 6,289,398 B1 | * | 9/2001 | Stallmo et al. ................ | 710/5 |
| 6,347,358 B1 | * | 2/2002 | Kuwata ....................... | 711/113 |
| 6,493,825 B1 | * | 12/2002 | Blumenau et al. .......... | 713/168 |
| 6,526,477 B1 | * | 2/2003 | Yuan et al. .................. | 711/114 |

* cited by examiner

*Primary Examiner*—Khanh Dang
*Assistant Examiner*—Kim T. Huynh
(74) *Attorney, Agent, or Firm*—Robert M. Carwell; Bracewell & Patterson, L.L.P.

(57) ABSTRACT

A method and apparatus for configuring redundant array of independent disks (RAID) are disclosed. A RAID includes a processor tray having a host processor, and a drive tray having a bridge chip and multiple attachment chips. The attachment chips are connected to each other in a loop configuration. Each of the attachment chips, which is assigned with an unique node ID, is connected to a respective disk drive. The host processor can direct more than one attachment chip to participate, in various ways, to a single data transfer around the loop. This is accomplished by directing the data transfer to a specified node ID, after configuring all the other attachment chips with temporary alias node ID identical to the specified node ID to which the data transfer operation is directed.

7 Claims, 6 Drawing Sheets

NULL Frame

| 0 0 m m m m - P - - - - - - - P | - - - - - - - P - - - - - - - P |

SENSE Frames

| 1 0 s s s s - P - - - - - n n P | n n n n n n n P n n n n n n n P |
| 1 1 s s s s - P - - - - - N N P | N N N N N N N P N N N N N N N P |

CONTROL Frames

| 0 1 m m m m c P c c i i i i i P | - - - - - - - P - - - - - - - P |

LOAD DIRECT

| 0 1 m m m m 0 P 0 0 i i i i i P | a a a a a a a P a a a a a a a P |

STORE DIRECT

| 0 1 m m m m 0 P 0 1 i i i i i P | a a a a a a a P a a a a a a a P |

LOAD DMA

| 0 1 m m m m 0 P 1 0 i i i i i P | d d d - - - - P - - - - - - - P |

STORE DMA

| 0 1 m m m m 0 P 1 1 i i i i i P | d d d - - - - P - - - - - - - P |

Other NODE CTL Frames

| 0 1 m m m m 1 P c c - - - - - P | - - - - - - - P - - - - - - - P |

*Fig. 5*

METHOD AND APPARATUS FOR CONFIGURING REDUNDANT ARRAY OF INDEPENDENT DISKS (RAID)

BACKGROUND OF THE INVENTION

1. Technical Field

The present invention relates to a method and apparatus for data processing in general and, in particular, to a method and apparatus for configuring direct access storage device. Still more particularly, the present invention relates to a method and apparatus for configuring redundant array of independent disks (RAID).

2. Description of the Prior Art

Redundant array of independent disks (RAID) is a method of storing data using multiple locations on more than one physical hard disk. By placing data on multiple hard disks, disk I/O operations can overlap in a balanced way. A RAID appears to an operating system as a single logical hard disk. RAID employs the technique of striping, which involves partitioning the storage space of each hard disk into small units ranging from a sector of 512 bytes up to several megabytes.

In a single-user system where large records, such as medical or other scientific images, are stored, stripes are typically set up to be small (perhaps 512 bytes) so that a single record spans all hard disks and can be accessed quickly by reading all hard disks at the same time. In a multi-user system, better performance requires establishing a stripe wide enough to hold a typical or maximum size record in order to allow overlapped disk I/O operations across multiple hard disks. Examples of various types of RAID are listed as follows:

RAID-0: RAID-0 has striping but no redundancy of data. It offers the best performance but no fault-tolerance.

RAID-1: RAID-1 is also known as disk mirroring and consists of at least two hard drives. There is no striping. Read performance is good since either hard disk can be read at the same time. Write performance is the same as the single disk storage. RAID-1 provides the best performance and the best fault-tolerance in a multi-user system.

RAID-2: RAID-2 uses striping across hard disks with some disks storing error checking and correcting (ECC) information.

RAID-3: RAID-3 uses striping and dedicates one hard disk to storing parity information. Embedded ECC information is used to detect errors. Data recovery is accomplished by calculating an exclusive OR (XOR) of the information recorded on the other hard disks. Since an disk I/O operation addresses all the hard disks at the same time, RAID-3 cannot overlap disk I/O operations. For this reason, RAID-3 is best for single-user systems with long record applications.

RAID-4: RAID-4 uses large stripes, which means records can be read from any single hard disk. Since all write operations have to update a parity disk, no disk I/O operation overlapping is possible.

RAID-5: RAID-5 includes a rotating parity array, thus, addressing the write limitation in RAID-4. Thus, all read and write operations can be overlapped. RAID-5 stores parity information but not redundant data (but parity information can be used to reconstruct data). RAID-5 requires at least three and usually five hard disks. RAID-5 is best for multi-user systems in which performance is not critical or few write operations are performed.

RAID-6: RAID-6 is similar to RAID-5 but includes a second parity scheme that is distributed across different hard disks and thus offers extremely high fault tolerance.

RAID-7: RAID-7 includes a real-time embedded operating system as a controller, caching via a high-speed bus, and other characteristics of a stand-alone computer.

10 RAID-10: RAID-10 offers an array of stripes in which each stripe is a RAID-1 array of hard disks. RAID-10 offers higher performance than RAID-1 but at much higher cost.

RAID-53: RAID-53 offers an array of stripes in which each stripe is a RAID-3 array of hard disks. RAID-53 offers higher performance than RAID-3 but at much higher cost.

The present disclosure provides an improved method and system for configuring RAID that is applicable to any of the above-mentioned RAID examples.

SUMMARY OF THE INVENTION

In accordance with a preferred embodiment of the present invention, a redundant array of independent disks (RAID) includes a processor tray having a host processor, and a drive tray having a bridge chip and multiple attachment chips. The attachment chips are connected to each other in a loop configuration. Each of the attachment chips, which is assigned with an unique node ID, is connected to a respective disk drive. The host processor can direct more than one attachment chip to participate, in various ways, to a single data transfer around the loop. This is accomplished by directing the data transfer to a specified node ID, after configuring all the other attachment chips with temporary alias node ID identical to the specified node ID to which the data transfer operation is directed.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 5 are depictions of various frame formats in accordance with a preferred embodiment of the present invention.

DETAILED DESCRIPTION OF A PREFERRED EMBODIMENT

Figure 1:
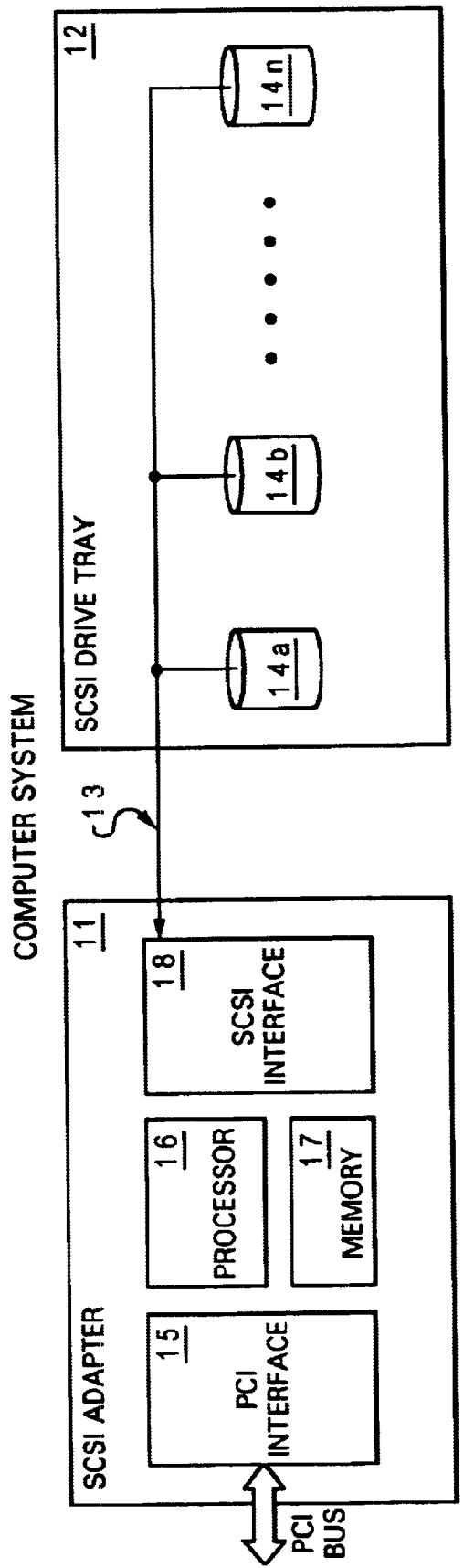
FIG. 1 is a block diagram of a small computer system interface (SCSI) drive tray attachment topology in which redundant array of independent disks (RAID) is typically configured according to the prior art.

Referring now to the drawings and in particular to FIG. 1, there is depicted a block diagram of a small computer system interface (SCSI) drive tray attachment topology in which redundant array of independent disks (RAID) is typically configured according to the prior art. As shown, a PCI-to-SCSI adapter chip 11 is connected to a SCSI drive tray 12 via a SCSI cable 13. PCI-to-SCSI adapter chip 11 includes a PCI interface 15, a processor 16 along with a memory 17, and a SCSI interface 18. SCSI cable 13 can extend some distance to SCSI drive tray 12 that: holds SCSI drives 14a–14n. For example, a 56-signal Ultra3 SCSI cable has an overall cable length limit of about 15 meters and an attachment maximum of about 15 SCSI drives.

Figure 2:
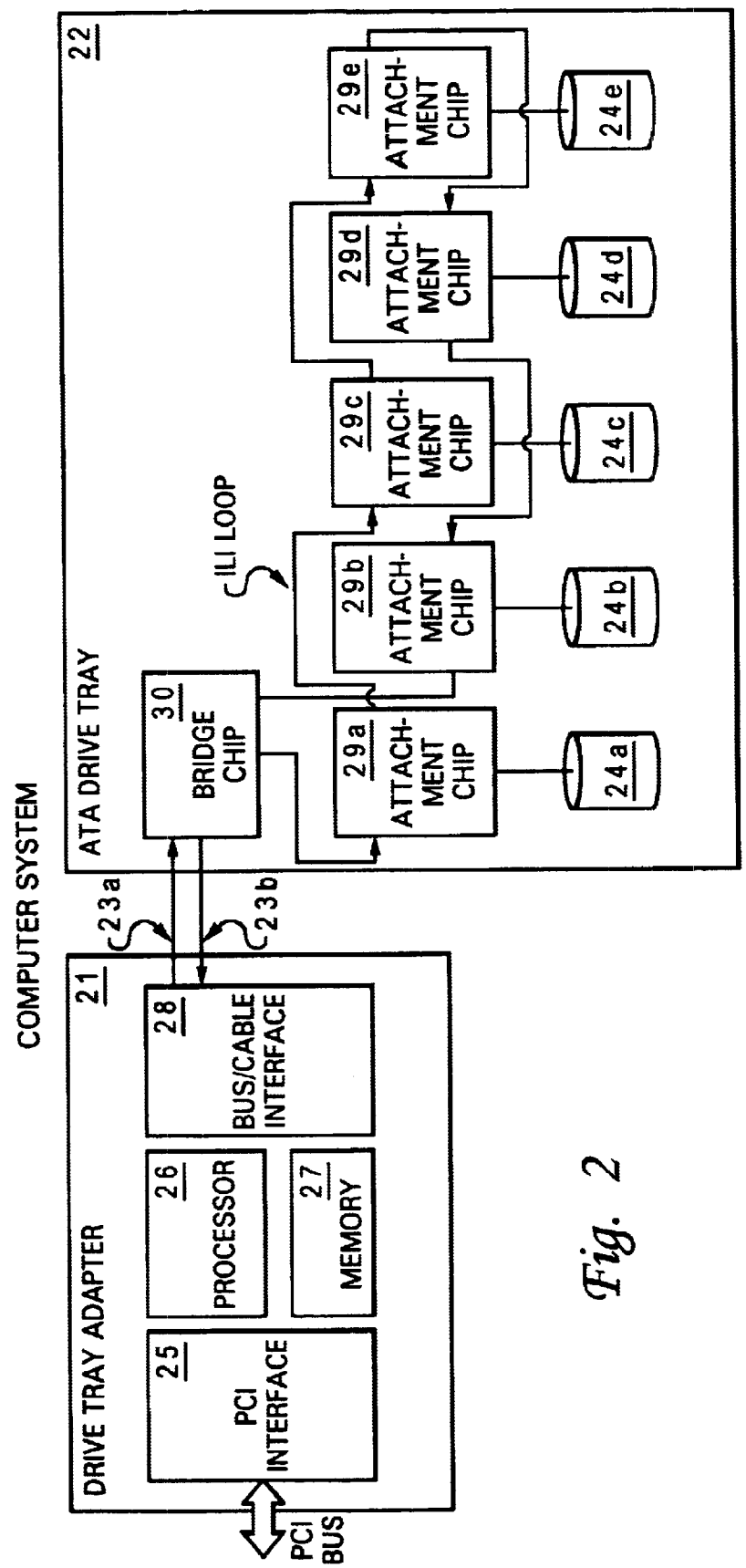
FIG. 2 is a block diagram of an AT attachment (ATA) drive tray attachment topology in which RAID is configured in accordance with a preferred embodiment of the present invention.

With reference now to FIG. 2, there is illustrated a block diagram of an AT attachment (ATA) drive tray attachment topology in which RAID is configured in accordance with a preferred embodiment of the present invention. As shown, a drive tray adapter chip 21 is connected to an ATA drive tray 22 via cables 23a, 23b. Drive tray adapter chip 21 includes a PCI interface 25, a processor 26 along with a memory 27, and a bus/cable interface circuit 28. Cables 23a, 23b can extend some distance to ATA drive tray 22. Two standard SCSI 68-conductor P cables (but not the SCSI protocol) can be used as cables 23a, 23b. Compared with FIG. 1, the multi-drop SCSI path within drive tray 12 is replaced by an Intermediate Loop Interface (ILI) that includes a loop of ILI/ATA attachment chips 29a–29e, one at each drive bay position. ILI/ATA attachment chips 29a–29e are connected to ATA hard drives 24a–24e, respectively. ILI/ATA attachment chips 29a–29e are connected to each other in an interleaved fashion. The loop of ILI/ATA attachment chips 29a–29e is terminated at one edge of ATA drive tray 22 by a bus/cable bridge chip 30. In essence, the bus/cable interface is a wider but lower speed bus for connecting to a drive tray adapter in a host processor drawer over a similar extended distance as the multi-drop SCSI path.

I. HARDWARE

A. ILI Loop

The ILI is based on a 16-bit data bus structure, plus a 1-bit SHIFT/CLOCK signal line. The entire ILI loop resembles a 16-bit wide shift register that operates at a rate determined by the SHIFT/CLOCK signal line. The architectural and performance parameters of the ILI are as follows:

ILI_DATA_IN: a 16-bit bus as received from a preceding attachment chip in an ILI loop ILI_SHIFT/CLOCK_IN: a single SHIFT/CLOCK signal from a preceding attachment chip in an ILI loop ILI_DATA_OUT: a 16-bit bus for driving a next attachment chip in an ILI loop ILI_SHIFT/CLOCK_OUT: a single SHIFT/CLOCK signal for driving a next attachment chip in the ILI loop Thus, an ILI port preferably includes 17 inputs-a 16-bit data bus and a SHIFT/CLOCK signal. After receiving a 16-bit data input and a SHIFT/CLOCK signal from a preceding ILI/ATA attachment chip in an ILI loop, an ILI/ATA attachment chip in turn drives a corresponding 16-bit output data bus and SHIFT/CLOCK signal on to a next ILI/ATA attachment chip in the ILI loop.

Figure 4:
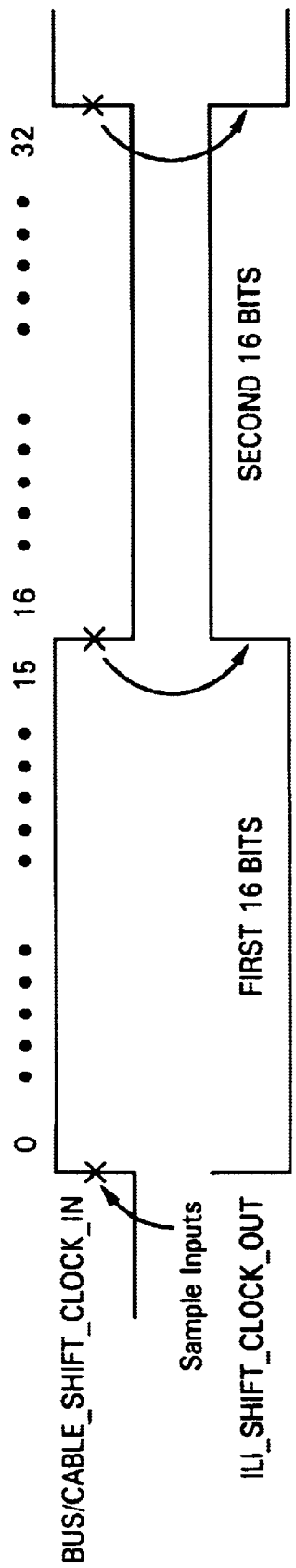
FIG. 4 is a timing diagram illustrating timings for information transfers over an ILI interface and a bus/cable interface, in accordance with a preferred embodiment of the present invention.

ILI DATA IN/OUT and ILI SHIFT/CLOCK IN/OUT signals are illustrated in FIG. 4. Each attachment chip in an ILI loop basically samples the first 16 bits on detecting an incoming UP transition on its SHIFT_CLOCK_IN line. As soon as this UP transition is detected, the attachment chip will also reset its SHIFT/CLOCK_OUT driver latch to ZERO. Thus, the next attachment chip will either "see" its input SHIFT/CLOCK_IN signal remain DOWN (if the ILI loop is starting up from a RESET_STATE), or transition DOWN if currently UP. In the latter case, the next attachment chip will sample its ILI_DATA_IN pins (driven by ILI_DATA_OUT from the preceding attachment chip) as the second 16 bits of a preceding frame. After resetting the SHIFT/CLOCK_OUT driver latch, the attachment chip will then transfer the sampled content of its ILI_DATA_IN lines to its ILI_DATA_OUT driver register, so these inputs become valid at the next attachment chip.

SHIFT/CLOCK signals are normally continuous, and are a clock source for all ILI/ATA attachment chips in an ILI loop. The frequency on the SHIFT/CLOCK signal line is preferably 75 MHz, so the raw information transport rate of an ILI loop is 300 Mbyte/s.

B. ILI/ATA Attachment Chips

Each ILI/ATA attachment chip, such as ILI/ATA attachment chips 25a–25e from FIG. 2, form a logical node in an ILI loop. Each ILI/ATA attachment chip in the ILI loop accepts ILI signals from a preceding attachment chip, and then re-powers the ILI signals (possibly with some modifications) for outputting to a next ILI/ATA attachment chip in the ILI loop. Because the ILI/ATA attachment chips in the ILI loop are connected in an interleaved fashion, as shown in FIG. 2, each ILI/ATA attachment chip within the ILI loop needs to only drive a number of short, point-to-point wiring traces, which form transmission lines properly terminated by one load at the input pin on the next ILI/ATA attachment chip.

Figure 3:
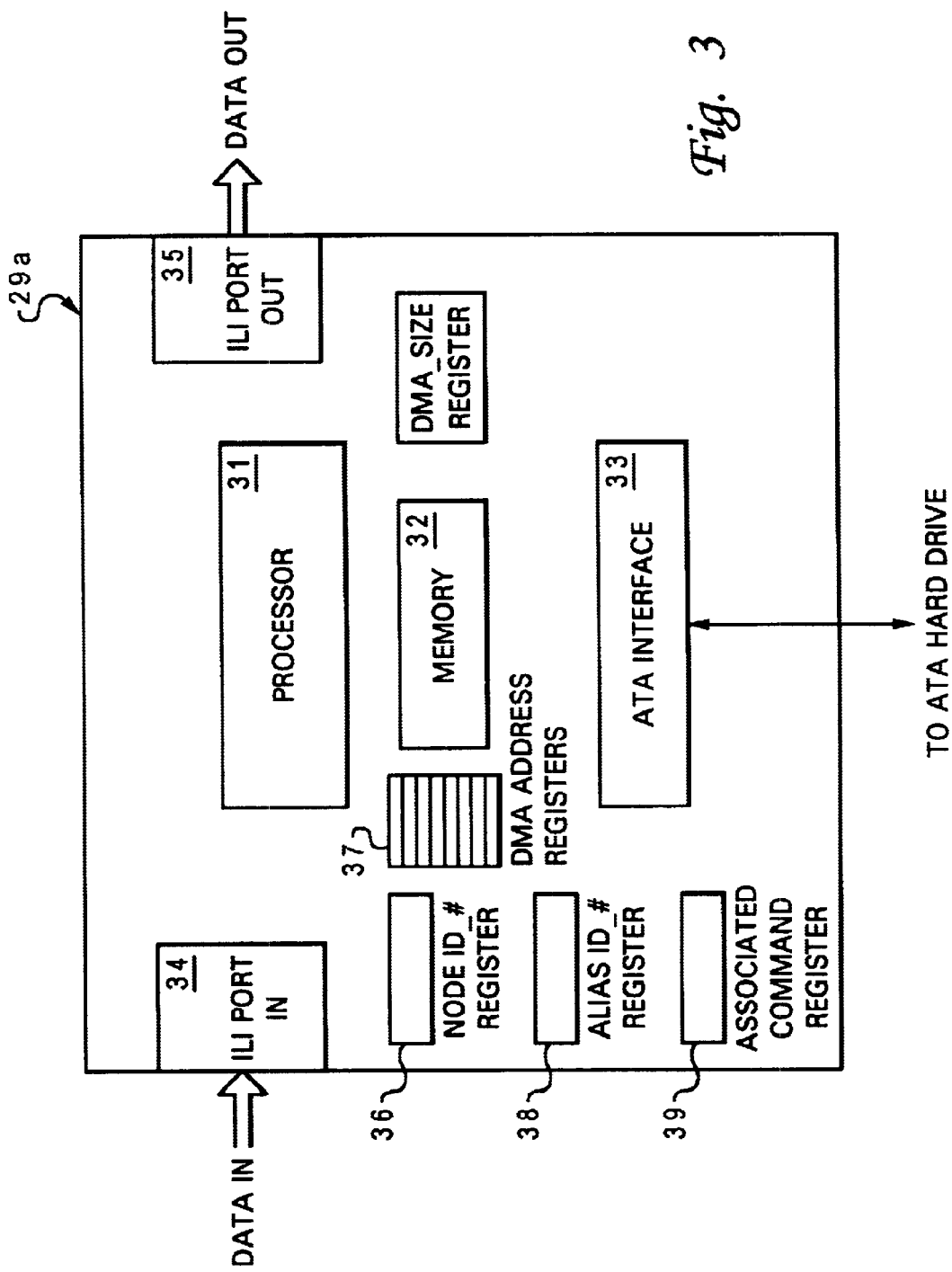
FIG. 3 is a block diagram of an ILI/ATA attachment chip in accordance with a preferred embodiment of the present invention.

Referring now to FIG. 3, there is illustrated a block diagram of an ILI/ATA attachment chip in accordance with a preferred embodiment of the present invention. As shown, an ILI/ATA attachment chip 29a includes a processor 31 for issuing/processing queued drive requests and for converting drive requests to appropriate ATA commands, a memory 32 for data buffering and for queuing drive request and status blocks, and functional microcode, and an ATA interface 33 for connecting to one (or optionally two) ATA disk drive. ILI/ATA attachment chip 29a is identified by an unique NODE_ID_# stored within a NODE_ID_# register 36.

ILI/ATA attachment chip 29a includes an ILI port IN 34 for receiving incoming signals, and an ILI port OUT 35 for sending outgoing signals. ILI/ATA attachment chip 29a also includes DMA address registers 37. Each of DMA address registers 37 may hold an address of memory 32 at which data from a host processor can be stored or retrieved. ILI/ATA attachment chip 29a also includes ALIAS ID register 38 for storing a NODE_ID_# of a different ILI/ATA attachment chip within the same ILI loop. The size of ALIAS ID register 38 is identical to the length of NODE_ID_# 36. With ALIAS ID register 38, a same group of data from host processor can be stored in more than one ILI/ATA attachment chip in a single store (or write) cycle. In essence, data will be stored in an ILI/ATA attachment chip having the specified NODE_ID_# along with the data and any ILI/ATA attachment chip having an alias NODE_ID_# (stored in a respective ALIAS ID register) that is identical to the specified NODE_ID_#. In addition to a store operation, other operations, such as XOR, can also be implemented. The details of such operations will be further described infra.

In addition, ILI/ATA attachment chip 29a includes an associated command register 39 for storing a command associated with a command having an ALIAS ID_#. Associated command register 39 is preferably two-bit long to provide NO_ASSOCIATION (don't respond), COPY, LOAD_XOR, and STORE_XOR functions.

The key architectural and performance parameters for ILI/ATA attachment chip 29a are as follows:

reset and test features, and an eight-way DMA for storing/retrieving data to/from memory 32 maximum number of ILI/ATA attachment chips on one ILI loop is preferably 32, which leads to 5-bit DMA_ ID # allowing up to 64 ATA drives to be connected per ILI interface each ILI loop has a checked data transfer rate of about 280 Mbytes/s, and loop latency to signal/report an event back to the host processor is under 1.5 microseconds

C. Bus/Cable Bridge Chip

The main purpose of bus/cable bridge chip 30 (in FIG. 2) is to provide a location for larger and more powerful driver circuits needed to transmit the ILI signals through the longer distances needed for connecting between a host processor drawer and drive trays. As indicated earlier, the ILI loop is based on a 32-bit logical frame, so bus/cable bridge chip 30 operates in a similar way as the 16-bit ILI bus, but with a 32-bit bus at half the clock rate. The key architectural and performance parameters for bus/cable bridge chip 30 are as follows:

BUS/CABLE_DATA_IN: a 32-bit data bus for receiving data from cable 23a (in FIG. 2)

BUS/CABLE_SHIFT/CLOCK_IN: a single SHIFT/CLOCK signal, also carried in cable 23a

BUS/CABLE_DATA_OUT: a 32-bit data bus for driving data back on cable 23b

BUS/CABLE_SHIFT/CLOCK_OUT: a single SHIFT/CLOCK signal, also carried in cable 23b

D. Bus/Cable Interface Circuit

Bus/Cable interface circuit 28 uses a 32-bit input data bus and a single SHIFT/CLOCK signal, with a corresponding output 32-bit data bus and SHIFT/CLOCK signal. It employs low-voltage differential signal (LVDS) transmission, so each signal requires two wires. Thus, 66 wires are needed for the input and 66 wires for the output. The standard inexpensive Ultra3 SCSI P-cables are 68 wires each, and so two such cables are sufficient to carry outbound and inbound complete bus/cable interfaces between a drive tray adapter in a host processor drawer and an ATA drive tray.

Logically, the overall system architecture is based on 32-bit frames, which are sent out by, bus/cable interface circuit 28 using 32 bits of data at a time on each positive transition of the bus/cable interface SHIFT/CLOCK line. Each frame is then converted by bus/cable bridge chip 30 into two 16-bit groups, sent out around the ILI loop at the next consecutive negative and positive SHIFT/CLOCK transitions. This reduces the I/O requirements for the ILI/ATA attachment chips in the ILI loop.

Four different types of logical frames (to be described in details infra) are allowed in an ILI loop, including a NULL frame. During normal operation, the SHIFT/CLOCK output from a host processor runs continuously, sending NULL frames if there is no interface activity. Thus, one SHIFT/CLOCK signal, derived at bus/cable interface circuit 28 from the host processor clock and relayed around bus/cable bridge chip 30 and ILI/ATA attachment chips 29a–29e, provides a clocking source for the entire ATA drive tray 22. There is then no need for separate oscillators or clock crystals. A phase lock/synchronization circuit on each of ILI/ATA attachment chip 29a–29eensures the UP/DOWN transitions on the SHIFT/CLOCK line remain relatively equally spaced, even if propagated through many ILI/ATA attachment chips, and an associated simple timeout circuit invokes a RESET state, should these SHIFT/CLOCK transitions cease. This provides an effective way of initializing the complete system.

II. SOFTWARE

The ILI architecture is arranged as a MASTER/SLAVE organization, and all ILI loop activities are initiated by frames sent from a host processor within a host processor drawer to ILI/ATA attachment chips within a drive tray via a bus/cable interface. The host processor is the ILI loop master, and the ILI/ATA attachment chips are the ILI loop slaves. Host and chip/node (or host and node) are the preferred terms in this disclosure instead of MASTER and SLAVE.

As mentioned previously, each ILI/ATA attachment chip forms a logical node on an ILI loop. Each ILI/ATA attachment chip has an unique NODE_ID_# that allows it to be specifically addressed. All operations over an ILI loop take place in 32-bit ILI frames that are transferred as two 16-bit data transfers on the two consecutive transitions of a single SHIFT/CLOCK cycle.

There are four basic kinds of ILI frames, namely, NULL frames, SENSE frames, CONTROL frames, and DATA frames. The frames are differ in terms of how various frame bits are checked/interpreted by a node, and the resulting node actions/responses. The first two bits of all ILI frames other than DATA frames identify whether the frame is a NULL (0 0) frame, a SENSE (1 0 or 1 1) frame, or a CONTROL (0 1) frame.

A. Error Checking and Data Transfers

All ILI frames other than DATA frames can be checked using two odd parity bits in each 16-bit transfer, denoted by the P positions in the frame format diagrams, as shown in FIG. 5.

Data transfers always take place in packets of multiple frames, using a more efficient SUMCHECK scheme. A single CONTROL frame, initiating the transfer, is followed by a payload packet of some number of DATA frames. Each DATA frame transports 32 bits of data, followed by a final 32-bit DATA frame with a SUMCHECK over the data transfer. Since all nodes in a loop "see" the CONTROL frame, they all know how many payload packet frames follow and must be checked by the SUMCHECK method, rather than ODD parity. Outbound data from the host processor is straightforward, but if the host processor sends a CONTROL frame requesting inbound data, it follows this by sending an empty data payload packet of all-zero frames, which is modified at the target node by inserting the requested data.

B. Event Signaling

All NULL and CONTROL frames incorporate a general purpose 4-bit field to be used by the microcode of an ILI/ATA attachment chip in signaling the progress or completion of real-time events back to the host processor. Essentially, each chip/node has a number of message latches that can be set by microcode. If set, a chip/node will perform an logical OR operation with a "1" into the corresponding MSGE field bit position as it propagates these frame types on to the next chip/node in the ILI loop, adjusting parity if necessary. The MSGE bit field is denoted by m . . . m in the frame format diagrams, as shown in FIG. 5.

C. NULL Frame

A NULL frame can be distinguished by frame bits 00 and 01 being both set to zeros, as shown in FIG. 5. It is principally used for initial ILI loop wiring path testing and loop node ID_# assignment as part of the ILI loop setup, and in error situations.

D. SENSE Frames

SENSE frames are used to resolve which specific node(s) are sending MSGE bit(s) so that the host processor can determine the appropriate action to take. For SENSE frames, the MSGE field becomes a SENSE MASK, denoted by the s . . . s bit positions in the frame format diagrams, as depicted in FIG. 5, allowing any combination of the four MSGE signal types to be tested with a single SENSE frame.

As up to 32 separate ID_# values can be in one ILI loop, separate SENSE_LO and SENSE_HI frame types are defined, to query the lo-order and hi-order nodes respectively. The queried nodes insert a single bit into their appropriate bit position(s) in the frame, if they have any MSGE latch set corresponding to an asserted SENSE MASK bit, adjusting the appropriate frame parity as necessary. These node ID_# bit positions are denoted by bit positions n . . . n in the SENSE_LO frame, and bit positions N . . . N in the SENSE_HI frame.

E. CONTROL Frames

There are basically eight main kinds of CONTROL frames, distinguished by 3 qualifying bits, which are indicated as c . . . c in the frame format diagrams, as illustrated in FIG. 5. CONTROL frames always specify one particular node ID_#, and so a 5-bit node ID field, denoted by i . . . i in the frame format diagrams, is always included in such frames.

Four of these CONTROL frames are reserved to initiate data transfer operations. There are two STORE operations and two LOAD operations, each with either a DIRECT or a DMA addressing mode. The DIRECT operations are intended for transfers of transaction request control, command and/or status blocks, so a fixed block size of 32 Bytes of data is always transferred by such commands. The DIRECT_ADDRESS is a 14-bit field denoted by a . . . a in the frame format diagrams.

F. LOAD DIRECT

The address field specifies the starting address in a memory of the target node, which is on a 32 byte boundary. A block of 32 bytes of data is fetched in ascending address order from the memory and transferred to the host processor. A total of 10 frames is required, the initial CONTROL frame as shown above, then 9 DATA frames, the final one holding a SUMCHECK over the preceding 8 frames. This command provides the capability to retrieve data from anywhere in the first contiguous 512 Kbytes of the memory.

G. STORE DIRECT

The address field specifies the starting address in a memory of the target node, which is on a 32 byte boundary. A block of 32 bytes of data from the host processor is stored in ascending address order into the memory of the target node. A total of 10 frames is required, the initial CONTROL frame, and 9 DATA frames, the final one being a SUMCHECK. This command provides the capability to store data anywhere in the first contiguous 512 Kbytes of the memory.

The DMA operations are intended for larger amounts of data, such as the disk drive data blocks associated with a transaction processing READ or WRITE request. Each ILI/ATA attachment chip contains a number of DMA addressing registers, one of which can be selected for any given LOAD_DMA or STORE_DMA operation.

These CONTROL frames thus include a 3-bit DMA_# field, indicated by d . . . d in the frame format diagrams, as shown in FIG. 5, allowing one of, for example, eight DMA registers to be selected.

H. LOAD DMA

The DMA_# field specifies the DMA address register to be used to provide a starting address in memory of the target node. A block of, for example, 64, 128, 256 or 512 bytes of data is fetched in ascending address order from the memory and transferred to the host processor. The amount of. data transferred is set by a DMA_SIZE register in each ILI/ATA attachment chip, which must first be properly initialized. After the initiating CONTROL frame, there follows a total of 17, 33, 65, or 129 DATA frames, the final one being a SUMCHECK.

This command provides the capability to retrieve data from anywhere in the memory addressing space that can be accessed by the DMA registers. At the end of the operation, the selected DMA register has been incremented by the amount transferred, ready to access the next contiguous area of the memory if needed.

I. STORE DMA

This command is the exact inverse of the LOAD_DMA command, the memory addressing and the amount of data transferred being determined in an identical fashion.

J. Other NODE CTL Frames

These frames provide the ability to set up the DMA address registers used in the LOAD_DMA and STORE_DMA operations mentioned above, as well as setting up the DMA_SIZE registers to control the amount of data transferred. The general purpose latches in a selected node or node(s) can also be reset and certain error handling features can be enabled or disabled.

Finally, and most importantly it is possible to set up nodes with an ALIAS ID_#, so that multiple nodes within an ILI loop can respond to the same LOAD_DMA or STORE_DMA operations. The ALIAS ID_# feature can be used in RAID configurations to further enhance performance.

Two types of DMA setup control frames are used, namely, DMA_SETUP_1 and DMA_SETUP_2. DMA_SETUP_1 is used to initialize a specific DMA register starting address in the target NODE ID_# to which the DMA SETUP_1: control frame is addressed. Optimally, the DMA_SETUP_1 frame can be immediately followed by a DMA_SETUP_2 control frame. This can be used to set up an ALIAS_ID_# in the target node of the DMA_SETUP_1 frame. Associated with this ALIAS is a separate DMA_# and an associated command register. Once an ALIAS ID_# is set up, the node will then also respond to LOAD_DMA or STORE_DMA operations directed to that ALIAS ID_#, as well as operations directed to its own NODE ID #. It can respond to ALIAS ID_# operations in various ways, depending on how the associated command register is set up.

CONTROL frame bit fields for DMA_SETUP_1 is in the form of:

| COMMAND | NODE_ID_# | DMA_# | ADDRESS |
|---------|-----------|-------|---------|
| 3-bit   | 5-bit     | 3-bit | 11-bit  |

Recall there are 32 possible nodes in an ILI loop, and each one has 8 DMA address registers. Thus, a NODE_ID_# field requires five bits and a DMA_# field requires three bits. The eleven remaining bits are used to specify a starting address for the selected DMA register. DMA operations are primarily for use in ATA drive data transfers, and as such, they must invariably be a multiple of the ATA drive sector size of 512 bytes. The 11-bit field thus need only specify the starting DMA address value in 512-byte units, so up to 1 Mbyte addressing capability is possible.

Once the complete CONTROL frame has been transferred into a node, and odd parity is verified, the NODE_ID_# field is compared with the node's NODE_ID_# register. No further action takes place if there is a mismatch; but if there is a match, then the register specified in the DMA_# field is selected, and loaded with the value in the address field (left-shifted 9 bits).

It is also required that a node selected for a DMA_SET_1 operation remains selected for the next frame, to allow for a possible DMA_SETUP_2 frame that does not use NODE_ID_#. This can then be used to set up an ALIAS ID_# and associated DMA_# and associated operation type.

CONTROL frame bit fields for DMA_SETUP_2 is in the form of:

| COMMAND | NODE_ID_# | DMA_# | ASSOCIATED_CMD | available |
|---------|-----------|-------|----------------|-----------|
| 3-bit   | 5-bit     | 3-bit | 2-bit          | 8-bit     |

A DMA_SETUP_2 control frame is only issued immediately following a DMA_SETUP_1 control frame. Recall that only one of the nodes in an ILI loop is going to have a latched state indicating it was the target for such a control frame. It is such node's selection state left from the preceding frame that determines which node will be the target and action this control frame, not the NODE_ID_# and DMA_# fields in the DMA_SETUP_2 frame itself.

The DMA_SETUP_2 control frame also includes an ASSOCIATED_CMD field, which determines the action taken by the selected node. If NO_ASSOCIATION is specified, the NODE_ID_# and DMA_# fields are discarded. If, however, one of several kinds of ASSOCIATION is specified, the NODE_ID_#, DMA_#, and the type of ASSOCIATION field are loaded into additional registers of the selected target node, and the NODE_ID_# becomes an ALIAS ID_# to which that attachment chip (node) will also respond.

Thus, two or more attachment chip may become involved in one DMA data transfer operation, and participate in a manner depending on the kind of associated operation specified. Both the NODE_ID_# specified in a STORE_DMA operation and another node having that ALIAS ID_# may accept the same data transfer, replicating it to their respectively specified memory areas for eventual writes to their ATA drives, for example.

CONTROL frame bit fields for LOAD_DMA transfer is in the form of:

| COMMAND | NODE_ID_# | DMA_# | reserved |
|---------|-----------|-------|----------|
| 3-bit   | 5-bit     | 3-bit | 11-bit   |

This CONTROL frame initiates a data transfer from a target NODE_ID_#, in ascending addressing order from the current DMA address value in the register selected by the DMA_# field. At completion this address register value is increased by the total transfer size, so it is ready to access the next contiguous area of the memory if required.

As for the LOAD_DIRECT transfer, the host processor follows the CONTROL frame with a packet of contiguous empty DATA frames, into which a target node inserts the requested data and a SUMCHECK. The packet size can be 17, 33, 65, or 129 DATA frames, the last one of which is for the SUMCHECK. The SUMCHECK is only verified at the host on receipt of the completed frame, or by any other nodes which might amend the data as it passes around the ILI loop.

CONTROL frame bit fields for STORE_DMA transfer is in the form of:

| COMMAND | NODE_ID_# | DMA_# | reserved |
|---------|-----------|-------|----------|
| 3-bit   | 5-bit     | 3-bit | 11-bit   |

Data is always transferred in packets of 17, 33, 65 or 129 DATA frames, the last one being a SUMCHECK. These are sent out by the host after this CONTROL frame, and contain 64, 128, 256 or 512 data bytes respectively. The CONTROL frame initiates a data transfer in to the memory of the target NODE_ID_#, in ascending order from the starting DMA address value which is in the register selected by the DMA_# field. At completion, the DMA address register value is incremented by the total size of the transfer, so it is ready to access the next contiguous area of the memory if required.

The CONTROL frame and its subsequent DATA frames are repeated around an ILI loop unchanged, odd parity checking being performed on receipt of the CONTROL frame at each node. Intermediate nodes that just relay the data do not test the SUMCHECK, however, it is verified by any node using the data, and by the host processor when the packet returns around the ILI loop.

III. RAID APPLICATIONS

The above-mentioned DMA_SETUP_1 and DMA_SETUP_2 can be used to improve the performance in several types of RAID applications.

A. RAID-1 Write/Update

Figure 6:
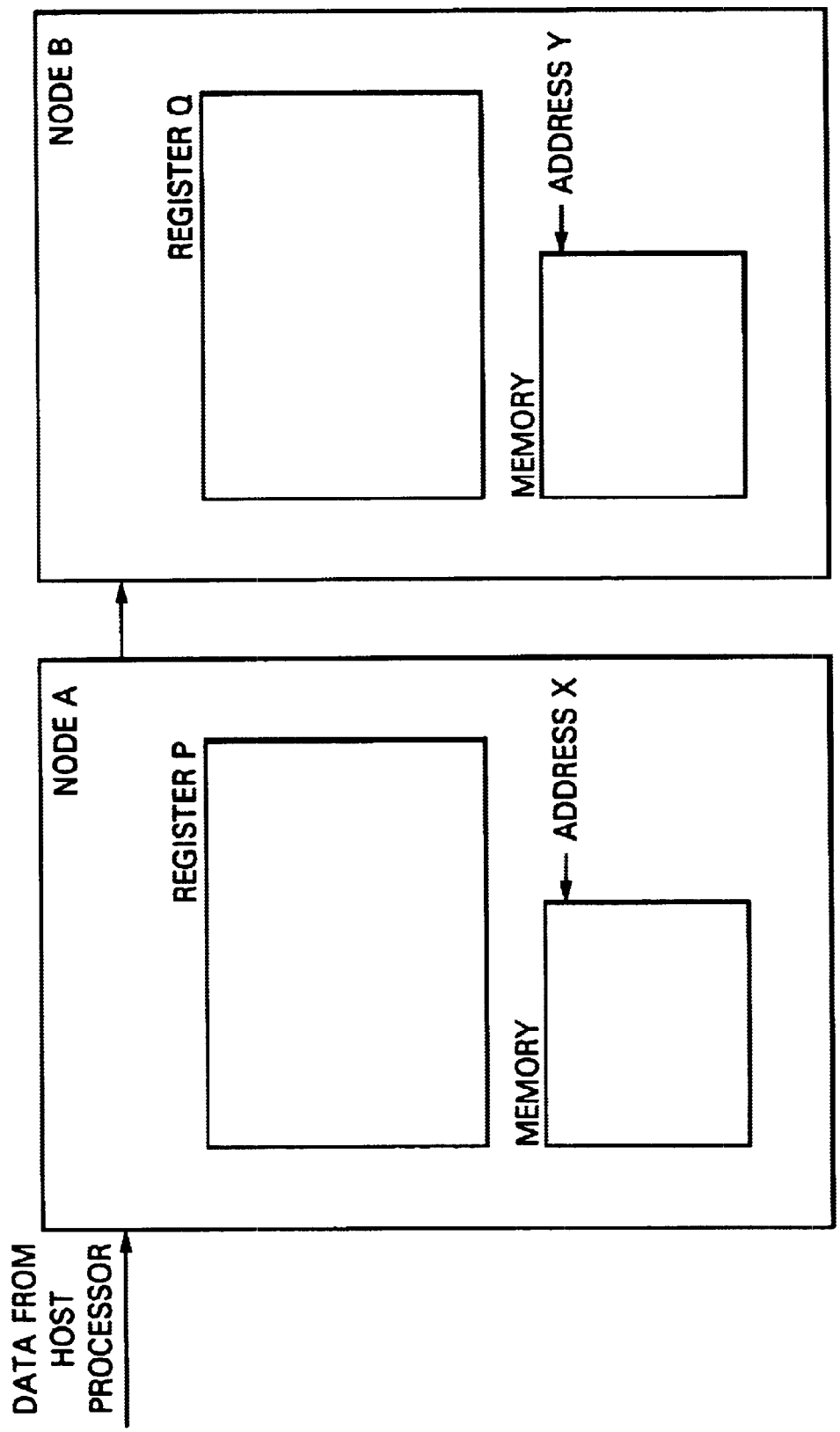
FIG. 6 is an example of a RAID-1 application in accordance with a preferred embodiment of the present invention.

Consider first a RAID-1 (or mirrored) configuration. Suppose a 4096-byte data block needs to be written two mirrored ATA drives, separately attached to a node A and a node B. Suppose the DMA registers to be used in node A and node B are register P and register Q respectively, and data areas starting at address X and address Y, respectively, are available as memories to hold the block of data from a host processor, as shown in FIG. 6. The following ILI frame sequence can be used to prepare for such a data transfer:

DMA_SETUP_1 to NODE_ID_#=A, DMA_#=P, ADDRESS=X

DMA_SETUP_2 to ALIAS ID_#=, DMA_#=, NO_ASSOCIATION

DMA_SETUP_1 to NODE_ID_#=B, DMA_#=Q, ADDRESS=Y

DMA_SETUP_2 to ALIAS ID_#=A, DMA_#=Q, COPY_FN

These four frames set up node A's DMA register P to a value X and set up node B's DMA register Q to a value Y. In addition, an ALIAS ID_# of node A is set into node B with a copy function (COPY_FN) associated with it, using DMA_# Q.

The 4096-byte data block is then transferred by one or more ILI STORE_DMA packets, each one having the following format:

STORE DMA to NODE ID #=A, DMA #=P

After the completion of a 4096-byte data transfer operation, the DMA register P in node A, will be at value X+4096, and register Q in node B will be at Y+4096. The 4096-byte data block will have been replicated into the memories within nodes A and B.

In contrast, a SCSI string would need two separate 4096 byte transfers, one to each drive, to accomplish this result, plus a command and checking overhead. In terms of efficient use of the available interface bandwidth, an approach of this kind is almost two times better than SCSI for RAID-1 write operations.

B. RAID-5 Write/Update

Now suppose the 4096-byte data block is to be written to a RAID-5 array of four data drives and one parity drive. Four separate 1024-byte data blocks are to be written to the four data drives, and a 1024-byte XOR of all these needs to be written to the parity drive.

Suppose the NODE_ID_# and DMA_# of the four data drives is A through D and P through S respectively, and the starting memory address values are V through Y respectively. For the parity drive, these parameters are E, T, and Z. The four 1024-byte data blocks are denoted as data D0 through data D3. A four-frame DMA_SETUP sequence similar to those shown in the RAID-1 section is initially used to setup E and T so it replicates the data loaded to A and P. The first block of data D0 is then transferred using one or more STORE_DMA operations, and is replicated into memory areas V through V+1023 of node A and Z through Z+1023 of node E.

Next a four-frame DMA_SETUP sequence is issued as follows:

DMA_SETUP_1 to NODE_ID_#=B, DMA_#=Q, ADDRESS=W

DMA_SETUP_2 to ALIAS ID_#=, DMA_#=, NO_ASSOCIATION

DMA_SETUP_1 to NODE_ID_#=E, DMA_#=T, ADDRESS=Z

DMA_SETUP_2 to ALIAS ID_#=B, DMA_#=T, XOR_ST_ASSOCIATION

The second block of data, D1, is now transferred using one or more STORE_DMA operations to NODE_ID_# B, DMA_# Q. Because of the XOR_STORE_ASSOCIATION, the second data block is also acted upon by node E, using its DMA register T. As each byte of data passes through node E, the corresponding location is fetched from the memory, then an XOR of the ILI data byte and the memory address value is stored back into the same address location. On completion of this operation, data D1 is in node B at memory address W through W+1023, and the byte XOR of D0 and D1 is in memory address T through T+1023 of node E.

A similar setup and data transfer operation is performed for data blocks D2 and D3, building the final complete XOR in node E's memory area T through T+1023.

SCSI needs four times 1024 data transfer and 1×1024 for the parity block. The ILI loop only needs four instead of five.

C. RAID-5 data recovery

A different type of ASSOCIATED_CMD can be used also to considerably reduce the required attachment bandwidth when recovering data after drive failures. Assume the same organization, NODE_ID_#, DMA_# and memory address areas as were used in the previous RAID-5 write example. Suppose further that data drive D2 has failed and is replaced with a fresh drive. Logically, the data block D2 can be recovered by an XOR of the parity drive data block with blocks D0, D1, and D3.

Assume the drive access and read commands have all been completed, and so memory areas in nodes A, B, D and E hold D0, D1, D3 and P respectively. A CONTROL frame sequence of DMA_SETUP commands is first issued:

DMA_SETUP_1 to NODE_ID_#=A, DMA_#=P, ADDRESS=V

DMA SETUP_2 to ALIAS ID_#=E, DMA_#=P, XOR_LD_ASSOCIATION

DMA_SETUP_1 to NODE_ID_#=B, DMA_#=Q, ADDRESS=W

DMA_SETUP_2 to ALIAS ID_#=E, DMA_#=Q, XOR_LD_ASSOCIATION

DMA_SETUP_1 to NODE_ID_#=D, DMA_#=S, ADDRESS=Y

DMA_SETUP_2 to ALIAS ID_#=E, DMA_#=S, XOR_LD_ASSOCIATION

DMA_SETUP_1 to NODE_ID_#=E, DMA_#=T, ADDRESS=Z

DMA_SETUP_2 to ALIAS ID_#=E, DMA_#=T, XOR_LD_ASSOCIATION

This is followed by a sequence of LOAD_DMA transfers, target NODE ID_#=E, and DMA_#=T, for 1024 bytes. Because of the XOR_LD ASSOCIATION setup, as the data packet frames come around the ILI loop from the host, all of nodes A, B, D and P will access their specified data areas in the memory, and XOR their result with the incoming data. The result is then relayed on to the next node.

The host processor will thus receive a single 1024-byte data record, which is the XOR of D0, D1, D3 and P, and is the reconstructed data block D2. The entire operation requires only one 1024-byte data transfer around the ILI loop, as opposed to four separate transfers with the SCSI drive implementations.

As has been described, the present invention provides an improved method and system for configuring RAID.

While the invention has been particularly shown and described with reference to a preferred embodiment, it will be understood by those skilled in the art that various changes in form and detail may be made therein without departing from the spirit and scope of the invention.

What is claimed is:

1. A redundant array of independent disks (RAID) configuration, comprising:

a processor tray having a host processor and a bus/cable interface; and a drive tray having a bridge chip and a plurality of attachment chips, wherein said bridge chip is connected to said bus/cable interface, wherein said plurality of attachment chips are connected to each other in an interleaved loop fashion, wherein each of said plurality of attachment chips is connected to a respective disk drive, wherein each of said plurality of attachment chips is assigned with an unique node ID, wherein said host processor can direct more than one attachment chip to participate, in various ways, to a single data transfer around said loop, when one of said attachment chips has a specified node ID and others among said plurality of attachment chips have alias node IDs identical to said specified node ID.

2. The computer system according to claim 1, wherein said disk drives are AT attachment drives.

3. The computer system according to claim 1, wherein said host processor communicates with said plurality of attachments chips via a plurality of frames.

4. The computer system according to claim 3, wherein said plurality of frames includes NULL frames, SENSE frames, CONTROL frames, and DATA frames.

5. An attachment device for attaching disk drives within a computer system, said attachment device comprising:

an Intermediate Loop Interface IN port for receiving frames from a preceding attachment device;

an Intermediate Loop Interface OUT port for sending frames to a next attachment device;

a node ID number register for storing a node ID number that identifies said attachment device;

an alias ID number register for storing an alias node ID number that identifies another attachment device;

a processor, coupled between said Intermediate Loop Interface IN port and said Intermediate Loop Interface OUT port, for processing a command embedded within a frame when said command includes said node ID number or said alias node ID number; and an AT attachment interface, coupled to said processor, for communicating said processed command to an attached hard drive.

6. The attachment device of claim 5, wherein said AT attachment interface is connected to an AT attachment drive.

7. The attachment device of claim 5, wherein said frames includes NULL frames, SENSE frames, CONTROL frames, and DATA frames.

* * * * *